US008224655B2

(12) United States Patent
Strom et al.

(10) Patent No.: US 8,224,655 B2
(45) Date of Patent: Jul. 17, 2012

(54) AUDIO HUMAN VERIFICATION

(75) Inventors: Nikko Strom, Mountain View, CA (US); Dylan F. Salisbury, Morgan Hill, CA (US)

(73) Assignee: Tell Me Networks, Redmond, WA (US)

( * ) Notice: Subject to any disclaimer, the term of this patent is extended or adjusted under 35 U.S.C. 154(b) by 0 days.

(21) Appl. No.: 13/230,699

(22) Filed: Sep. 12, 2011

(65) Prior Publication Data

US 2012/0004914 A1 Jan. 5, 2012

Related U.S. Application Data

(63) Continuation of application No. 11/425,651, filed on Jun. 21, 2006, now Pat. No. 8,036,902.

(51) Int. Cl.
*G10L 21/00* (2006.01)

(52) U.S. Cl. ........................................ 704/275

(58) Field of Classification Search .................. 704/275
See application file for complete search history.

(56) References Cited

U.S. PATENT DOCUMENTS

| | | | | |
|---|---|---|---|---|
| 7,275,032 | B2 * | 9/2007 | Macleod | 704/243 |
| 2002/0198717 | A1 * | 12/2002 | Oudeyer et al. | 704/270 |
| 2003/0163316 | A1 | 8/2003 | Addison et al. | |
| 2004/0005066 | A1 | 1/2004 | Kraemer | |
| 2004/0254793 | A1 * | 12/2004 | Herley et al. | 704/270 |
| 2006/0136219 | A1 * | 6/2006 | Wang | 704/273 |
| 2007/0179905 | A1 * | 8/2007 | Buch et al. | 705/75 |
| 2008/0046986 | A1 * | 2/2008 | Pinkas et al. | 726/6 |

OTHER PUBLICATIONS

U.S. Appl. No. 11/425,651, filed Jun. 21, 2006, Strom et al.
"Proposal for an Accessible Captcha," Standards-schmandards.com, Jun. 8, 2006, 9 pages.
"Raising the Awareness of Web Site Accessibility and Marketing—Google Releases Audio CAPTCHA," Web Site Accessibility Blog, Matt Bailey's Accessibility Outlook, Apr. 11, 2006, 4 pages.
Chan, Tsz-Yan, "Using a Text-to-Speech Synthesizer to Generate a Reverse Turning Test," Proc. of the 15th IEEE International Conference on Tools with Artificial Intelligence, 2003, 7 pages.
Kain, A. et al., "Spectral Voice Conversion for Text-To-Speech Synthesis," 1998 IEEE International Conference on Acoustics, Speech, and Signal Processing, vol. 1, pp. 285-288.
Kesmodel, D., "Codes on Sites 'Captcha' Anger of Web Users," The Wall Street Journal, May 31, 2006, 3 pages.
Kochanski, G. et al., "A Reverse Turing Test Using Speech," 7th International Conference on Spoken Language Processing, Denver, Colorado, USA, Sep. 16-20, 2002, 4 pages.
Rui, Y. et al., "ARTiFACIAL: Automated Reverse Turning Test Using FACIAL Features," Proc. of the 11th ACM International Conference on Multimedia, Nov. 2003, pp. 493-502.
Shieber, S. M., "Lessons from a Restricted Turing Test," Communications of the Association for Computing Machinery 37, Apr. 15, 1993, pp. 70-78.

(Continued)

*Primary Examiner* — Michael N Opsasnick
(74) *Attorney, Agent, or Firm* — Perkins Coie LLP

(57) ABSTRACT

A system generates an audio challenge that includes a first voice and one or more second voices, the first voice being audibly distinguishable, by a human, from the one or more second voices. The first voice conveys first information and the second voice conveys second information. The system provides the audio challenge to a user and verifies that the user is human based on whether the user can identify the first information in the audio challenge.

20 Claims, 6 Drawing Sheets

OTHER PUBLICATIONS

Verhelst, W. et al., "An Overlap-Add Technique Based on Waveform Similarity (WSOLA) for High Quality Time-Scale Modification of Speech," 1993 IEEE International Conference on Acoustics, Speech, and Signal Processing, vol. 2, pp. 554-557.

* cited by examiner

AUDIO HUMAN VERIFICATION

CROSS REFERENCE TO RELATED APPLICATIONS

This application is a continuation of U.S. patent application Ser. No. 11/425,651, filed Jun. 21, 2006, now U.S. Pat. No. 8,036,902, issued Oct. 11, 2011, entitled "AUDIO HUMAN VERIFICATION," the entirety of which application is incorporated by reference herein.

TECHNICAL FIELD

Implementations described herein relate generally to human verification techniques, and more particularly, to the use of audio content for human verification.

BACKGROUND

Web sites often provide information about products, services, etc. to users. Many web sites desire a user to "register" before their web servers will grant access to the user. During registration, a user typically supplies personal information such as, for example, a username, an account number, an address, a telephone number or an e-mail address to the registering web site. When registering a user for the first time, a web site may request that the user select a login identifier, or login ID, and an associated password. The login ID allows the web site to identify the user and retrieve information about the user during subsequent user visits to the web site. Generally, the login ID is unique to the web site such that no two users have the same login ID. The combination of the login ID and password associated with the login ID allows the web site to authenticate the user during subsequent visits to the web site. The password also prevents others, who do not know the password, from accessing the web site using the user's login ID.

Automated systems, such as, for example, automated "bots," permit a malicious user to emulate human interaction with a web site for registering a large number of new accounts associated with fictitious users. Automated systems pose a problem because they can register fictitious users at a much faster rate than a human can. Such automated system registrations may have several undesirable consequences. For example, because many electronic mail (or e-mail) services allow users to filter out unsolicited mass mailings (i.e., spam) based on the sender's address, running automated systems to register new e-mail accounts enables the malicious user to continue sending spam from the new accounts in the face of such filtering.

Several techniques have been designed to prevent automated system registrations. For example, the concept of "Turing tests" for interrogating two unseen respondents, a human and a computer, has been developed to determine which of the two is the computer. Completely Automated Public Turing test to tell Computers and Humans Apart (CAPTCHA) is a technique that creates puzzles designed to be solvable by humans but not by computers for distinguishing humans and computers over a network. Typically, the puzzles involve having the user read a sequence of characters from a visually cluttered image. CAPTCHA, thus, takes advantage of the ability of humans to distinguish certain kinds of images better than automated systems, such as, for example, bots.

SUMMARY

Consistent with one aspect, a method may include generating an audio challenge that includes a first voice and one or more second voices, the first voice being audibly distinguishable, by a human, from the one or more second voices, the first voice conveying first information and the second voice conveying second information. The method may further include providing the audio challenge to a user and verifying that the user is human based on whether the user can identify the first information in the audio challenge.

Consistent with another aspect, a method may include creating first audio content that includes a first voice conveying information and creating second audio content that includes multiple second voices. The method may further include combining the first and second audio content and providing the combined audio content to a user. The method may also include verifying if the user can identify the information to determine whether the user is human.

Consistent with a further aspect, a method may include obtaining a key, producing a first audio segment that includes an audio version of the key and producing a second audio segment. The method may further include mixing the first and second audio segments to produce mixed audio, providing the mixed audio to a user and receiving a reply from the user in response to provision of the mixed audio. The method may also include determining whether the user is human by ascertaining whether the reply from the user includes the key.

BRIEF DESCRIPTION OF THE DRAWINGS

The accompanying drawings, which are incorporated in and constitute a part of this specification, illustrate one or more exemplary embodiments and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Exemplary embodiments apply an audio version of the distorted images of CAPTCHA (e.g., that web sites use to prevent automated systems such as bots from roaming their sites and creating fake login IDs) to differentiate humans from automated systems using audio challenges. Human audio pattern recognition is different than, and in many ways superior to, machine audio pattern recognition algorithms. Exemplary embodiments, thus, exploit these disparities in audio pattern recognition between humans and automated systems by creating audio content having characteristics that are recognizable by humans but are less likely to be recognized by automated systems. This audio content may be used to verify that a given user is a human, and not an automated system.

Overview

Figure 1:
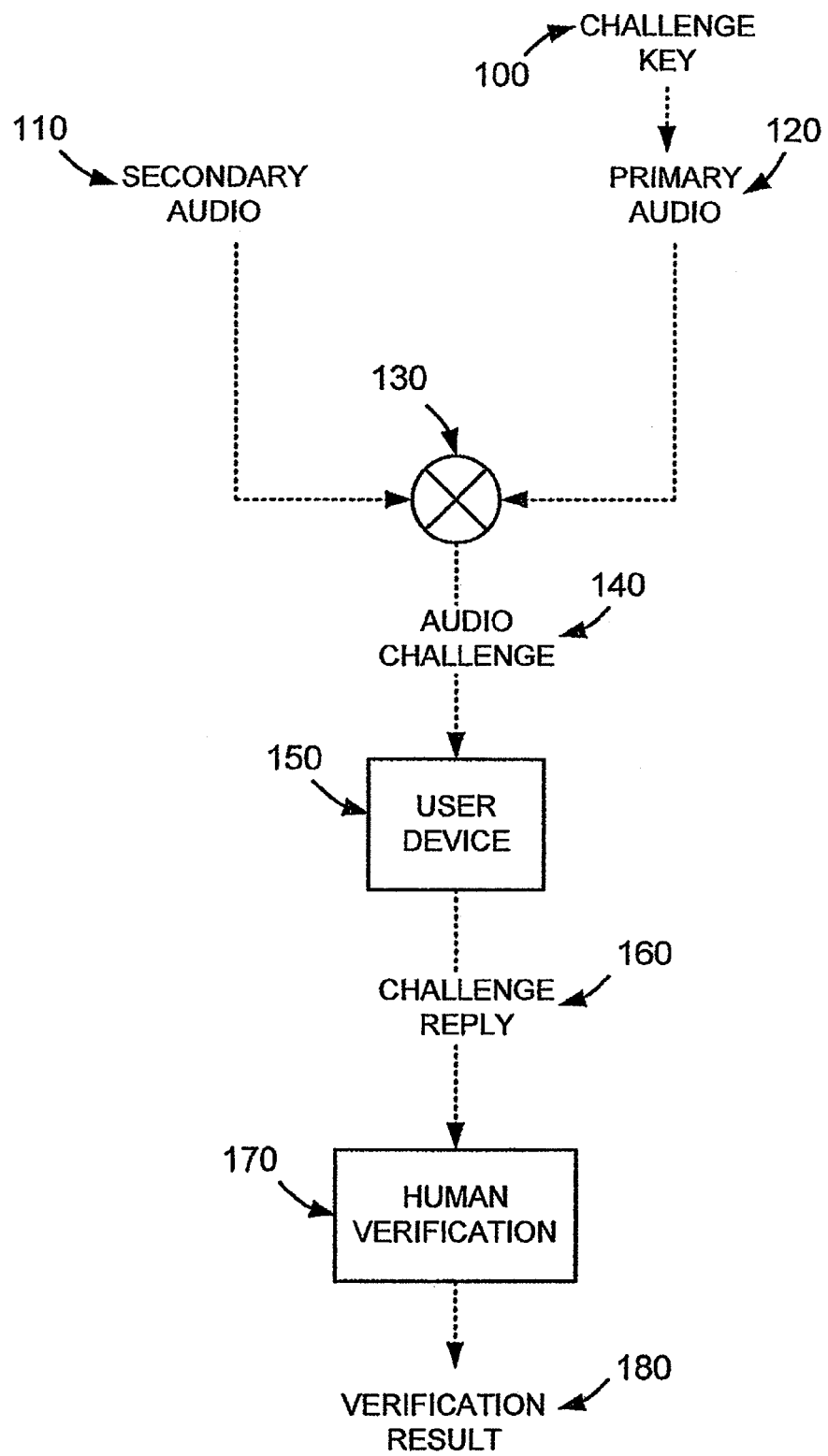
FIG. 1 is a diagram of an exemplary overview of an exemplary embodiment.

FIG. 1 illustrates an overview of an exemplary embodiment that uses audio content for human verification. As shown in the exemplary embodiment of FIG. 1, a challenge key 100 may be included in a segment of primary audio 120. Challenge key 100 may include any type of content that may be used as a key. For example, challenge key 100 may include a sequence of random numbers. Primary audio 120 may include audio content (e.g., a spoken voice) that includes challenge key 100. For example, primary audio 120 may include the sequence of random numbers of challenge key 100 spoken in a female voice, with each number of the sequence spoken with a random duration and with a random interval between the number and a previously spoken number in the sequence. Secondary audio 110 may include audio content, such as, for example, one or more spoken voices. As one example, secondary audio 110 may include multiple male voices speaking different sequences of random letters, with each letter of each letter sequence spoken with a random duration and with a random interval between each letter and a previously spoken letter in a respective sequence. Secondary audio 110 may also include random spoken words, non-English words or characters, sounds from an audio corpus designed specifically to obscure primary audio 120 for automated system, audio "jibberish," etc.

While described as using male and female voices, primary audio 120 and secondary audio 110 may both include only male voices or only female voices. Voices for primary audio 120 and secondary audio 110 should be selected such that the voice in the primary audio can be distinguished from voice(s) in the secondary audio (i.e., the primary audio 120 voice is audibly distinguishable from the one or more voices of secondary audio 110). In some implementations, a voice(s) of primary audio 120 and secondary audio 110 may sound like the same human speaker, but differ only by pitch or rate of speech.

Primary audio 120 and secondary audio 110 may be mixed together in mixer 130 to produce a mixed audio output audio challenge 140. In one implementation, audio challenge 140 may include the female voice speaking the sequence of random numbers of primary audio 120 mixed in with the multiple male voices speaking different sequences of random letters of secondary audio 110. Audio challenge 140 may be sent to a user device 150 via, for example, a network (not shown). In response to audio challenge 140, a user operating user device 150 may perceive audio challenge 140 and may respond with a challenge reply 160. For example, prior to receiving audio challenge 140, the user operating user device 150 may receive an audio instruction to extract challenge key 100 from audio challenge 140 by remembering the sequence of numbers spoken by a female voice in audio challenge 140. The user operating user device 150 may, thus, listen to audio challenge 140 and differentiate the female voice speaking the random sequence of numbers of primary audio 120 from the multiple male voices speaking the random sequence of letters of second audio 110. By differentiating the female voice from the multiple male voices, the user may extract the challenge key 100 and provide a challenge reply 160 that includes the extracted challenge key 100.

A human verification process 170 may analyze challenge reply 160 to produce a verification result 180 that indicates the likelihood of whether the user that responded with challenge reply 160 is a human or an automated system. Humans can more easily recognize characteristics of the mixed audio content audio challenge 140 than automated speech recognition systems. Therefore, an automated system speech recognition system is more likely to provide an incorrect challenge reply 160 as compared to a human user, thus, indicating that the "user" is not human. If verification process 170 determines that the challenge reply 160 includes challenge key 100, then verification result 180 may indicate that the user operating user device 150 is human and not an automated system.

Exemplary System

Figure 2:
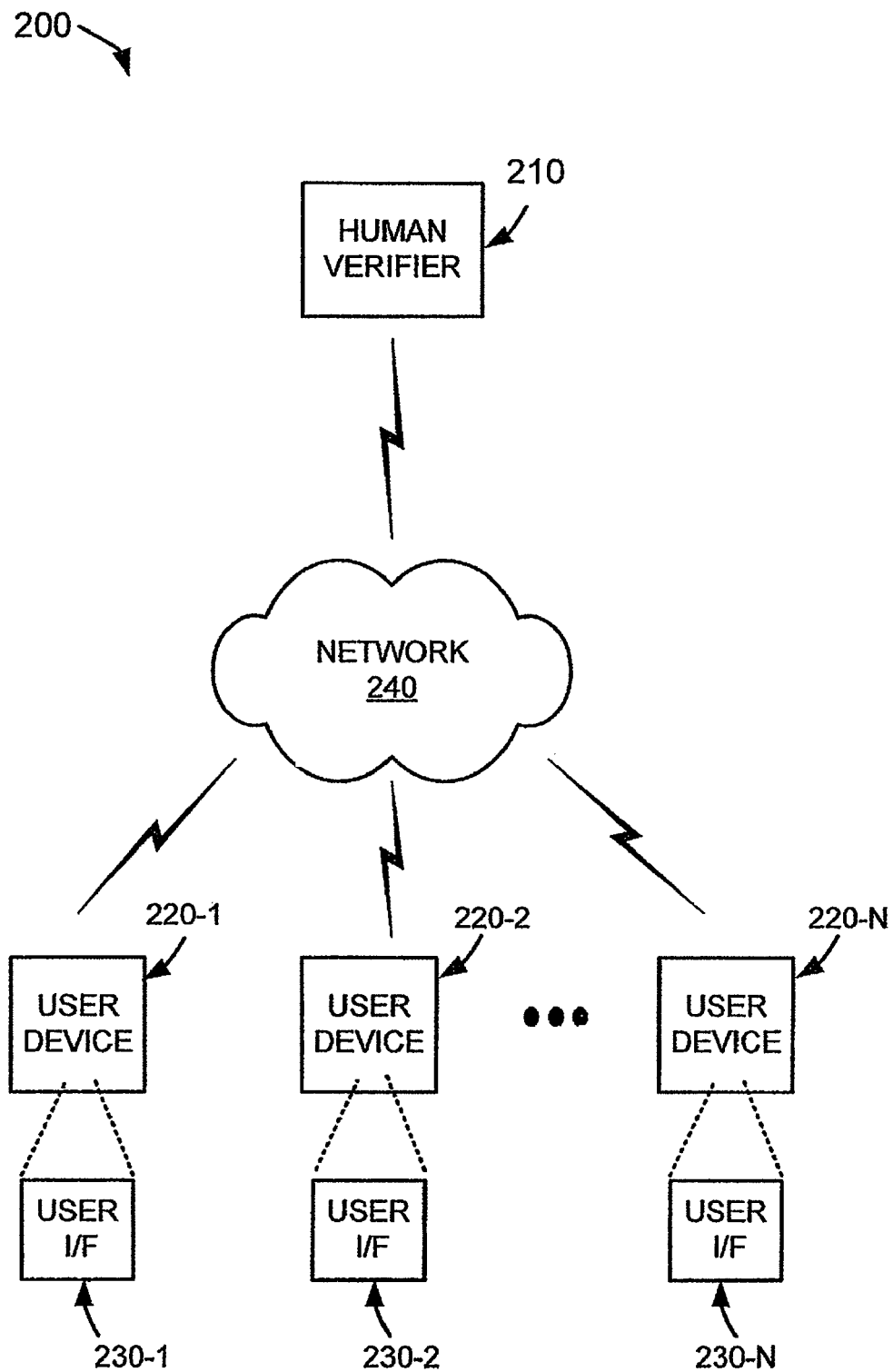
FIG. 2 is a diagram of an exemplary system that performs human verification consistent with an exemplary embodiment.

FIG. 2 illustrates an exemplary system 200 that implements audio human verification consistent with exemplary embodiments. System 200 may include a human verifier 210 interconnected with user devices 220-1 through 220-N (collectively referred to as "user devices 220" and referred to in the singular as "user device 220-J," where J may include any number from 1 to N) via a network 240. Human verifier 210 and user devices 220 may interconnect with network 240 using wired, wireless or optical connection links.

Network 240 may include one or more sub-networks of any type, including a local area network (LAN), a wide area network (WAN), a satellite network, a metropolitan area network (MAN), a telephone network, such as the Public Switched Telephone Network (PSTN) or a Public Land Mobile Network (PLMN), an intranet, the Internet, or a combination of networks. The PLMN(s) may further include a packet-switched sub-network, such as, for example, General Packet Radio Service (GPRS), Cellular Digital Packet Data (CDPD), or Mobile IP sub-network.

Human verifier 210 may include any type of client or server entity that includes functionality to provide audio challenges to user devices 220 via network 240. User devices 220 may include any type of device that can receive audio challenges from human verifier 210. User devices 220 may include, for example, personal computers, telephones, cellular radiotelephones, Personal Communications System (PCS) terminals, personal digital assistants (PDAs), laptops and/or palmtop receivers, appliances that include radiotelephone transceivers, or the like. A PCS terminal may combine a cellular radiotelephone with data processing, facsimile and/or data communications capabilities.

User devices 220-1 through 220-N may each include an associated user interface (I/F) 230-1 through 230-N (collectively referred to as "user I/F 230" and referred to in the singular as "user I/F 230-J," where J may include any number from 1 to N) that may be utilized by a user to receive audio content from human verifier 210 and/or to supply a reply to the received audio content back to human verifier 210. User I/Fs 230 may include any type of mechanism for receiving an audio challenge from human verifier 210. User I/Fs 230 may further include any type of mechanism for replying to an audio challenge from human verifier 210 including, for example, a keypad, a keyboard, a microphone for receiving a voice reply, a mouse, a pen-based pointing device, etc.

In some implementations, a user device 220 may be physically attached to human verifier 210. In such an implementation, human verifier 210 may provide audio challenge 140 to the physically attached user device 220 such that a user, collocated physically with human verifier 210, may provide challenge reply 160.

In other implementations, user I/F 230 may include separate devices for receiving audio challenge 140 and for providing challenge reply 160. For example, a user may receive audio challenge 140 via a telephone call, and provide challenge reply 160 to human verifier 210 via a web page on a computer. Each of the separate devices for receiving audio challenge 140 and for providing challenge reply 160 may use different networks, instead of a single network 240 as shown in FIG. 2. Thus, a user may receive audio challenge 140 via a telephone call over a PSTN and may reply with challenge reply 160 via a computer over a packet-switched network, such as, for example, the Internet.

Exemplary Human Verifier Device

Figure 3:
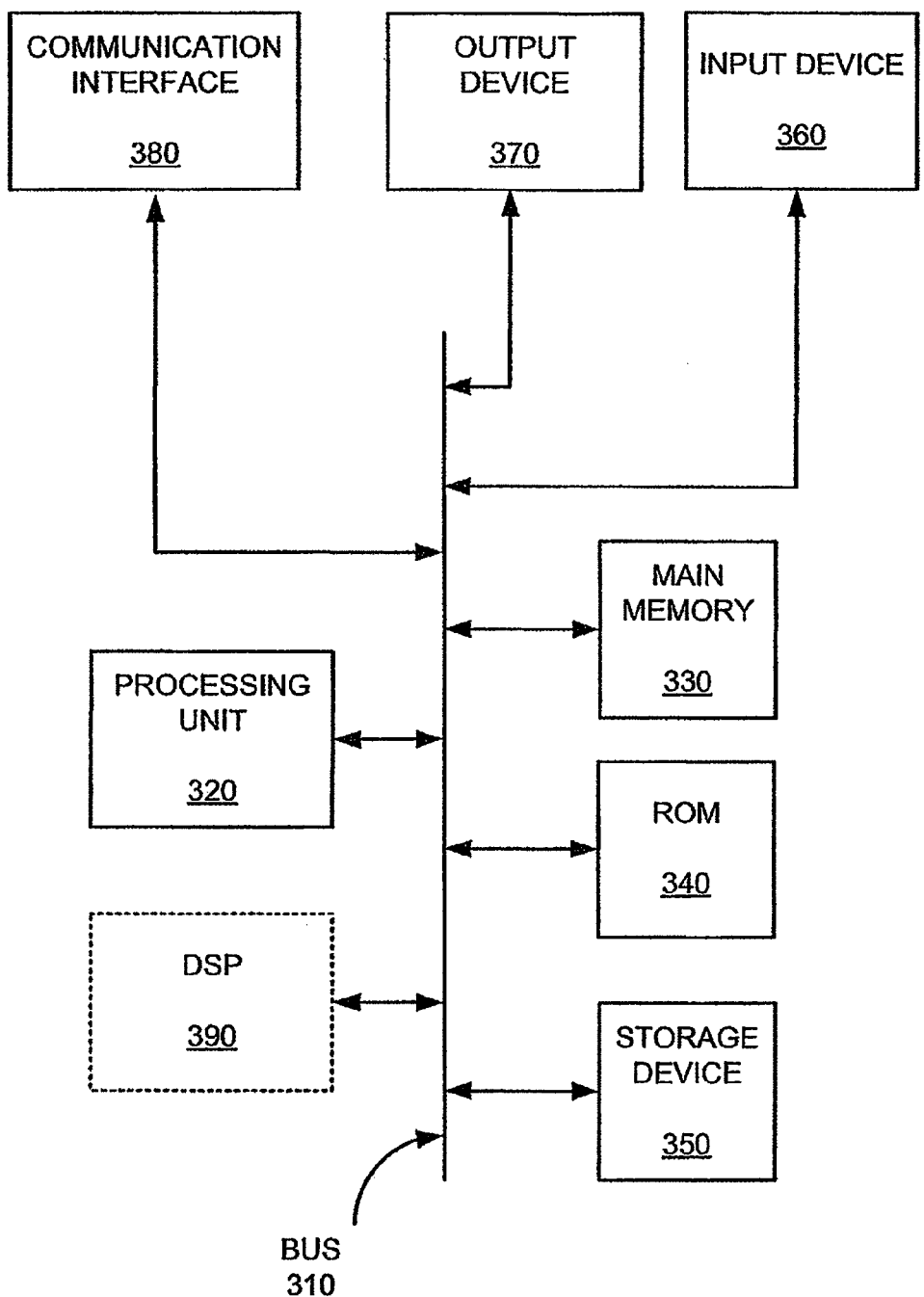
FIG. 3 is a diagram of exemplary components of the human verifier of FIG. 2 consistent with an exemplary embodiment.

FIG. 3 is a diagram of human verifier 210 according to an exemplary implementation. User devices 220 may be similarly configured. Human verifier 210 may include a bus 310, a processing unit 320, a main memory 330, a read only memory (ROM) 340, a storage device 350, an input device 360, an output device 370, a communication interface 380 and a digital signal processor (DSP) 390. Bus 310 may include a path that permits communication among the elements of human verifier 210.

Processing unit 320 may include a processor, microprocessor, or processing logic that may interpret and execute instructions. Main memory 330 may include a random access memory (RAM) or another type of dynamic storage device that may store information and instructions for execution by processing unit 320. ROM 340 may include a ROM device or another type of static storage device that may store static information and instructions for use by processing unit 320. Storage device 350 may include a magnetic and/or optical recording medium and its corresponding drive.

Input device 360 may include a mechanism that permits an operator to input information to human verifier 210, such as a keyboard, a mouse, a pen, voice recognition and/or biometric mechanisms, etc. Output device 370 may include a mechanism that outputs information to the operator, including a display, a printer, a speaker, etc. Communication interface 380 may include any transceiver-like mechanism that enables human verifier 210 to communicate with other devices and/or systems. For example, communication interface 380 may include mechanisms for communicating with user devices 220 via a network, such as network 240. DSP 390 may perform functions such as voice coding, equalization, speech generation, and audio signal processing.

Human verifier 210, consistent with exemplary implementations, may perform certain operations or processes, as will be described in detail below. Human verifier 210 may perform these operations in response to processing unit 320 executing software instructions contained in a computer-readable medium, such as memory 330. A computer-readable medium may be defined as a physical or logical memory device and/or carrier wave.

The software instructions may be read into memory 330 from another computer-readable medium, such as data storage device 350, or from another device via communication interface 380. The software instructions contained in memory 330 may cause processing unit 320 to perform operations or processes that will be described later. Alternatively, hardwired circuitry may be used in place of or in combination with software instructions to implement processes consistent with the principles of the invention. Thus, exemplary implementations are not limited to any specific combination of hardware circuitry and software.

Exemplary Human Verifier Functional Diagram

Figure 4:
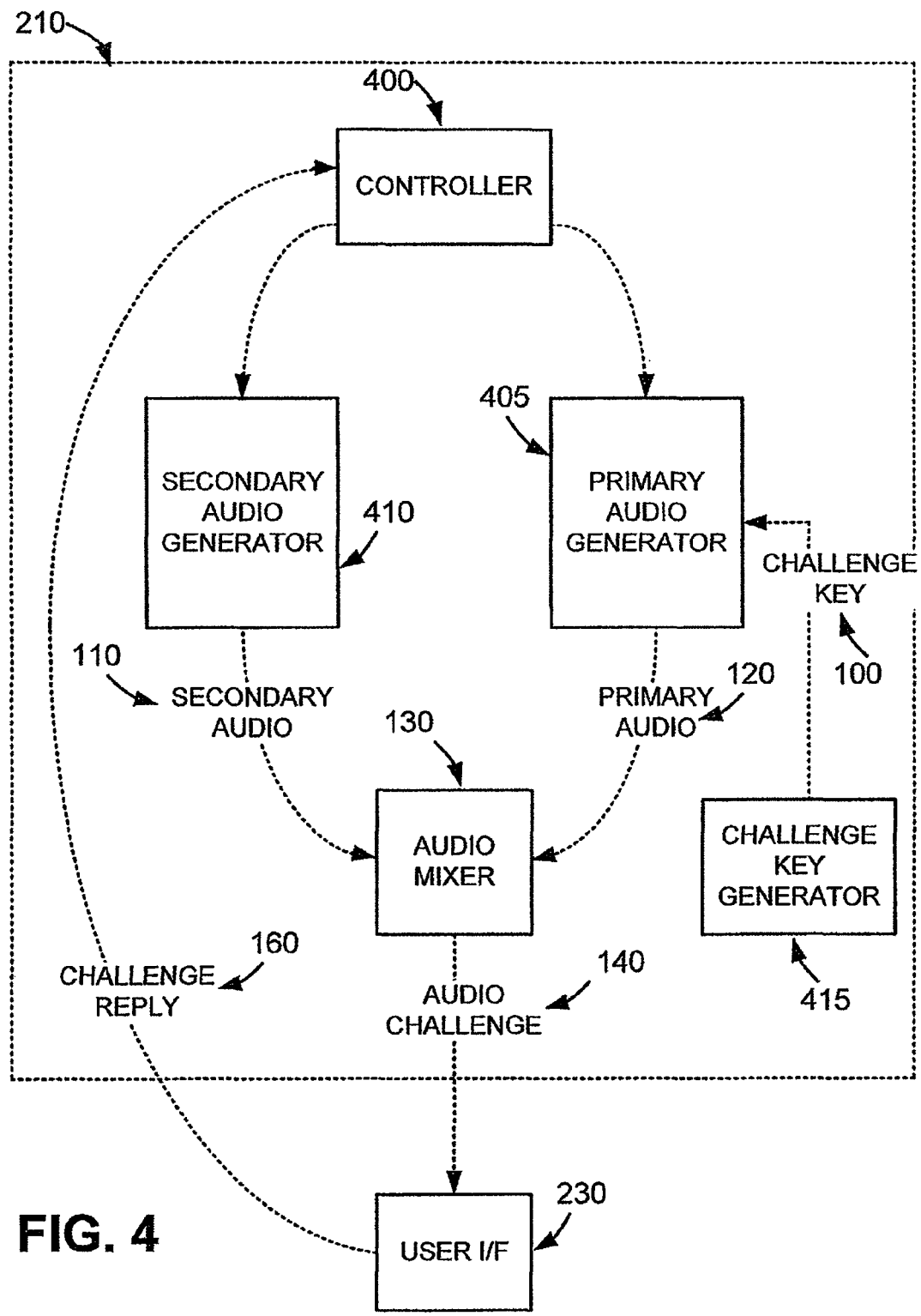
FIG. 4 is a functional diagram of the human verifier of FIG. 2 consistent with an exemplary embodiment.

FIG. 4 illustrates a functional diagram of human verifier 210 consistent with exemplary implementations. From a functional standpoint, human verifier 210 may include a controller 400, a primary audio generator 405, a secondary audio generator 410, a challenge key generator 415 and audio mixer 130. Controller 400 may include, for example, processing logic for controlling the operation of primary audio generator 405, secondary audio generator 410, audio mixer 420 and challenge key generator 415. Controller 400 may, for example, be implemented by processing unit 320.

Primary audio generator 405 may receive an input challenge key 100 and, based on the content of challenge key 100, may produce primary audio 120. In one implementation, challenge key generator 415 may generate and provide challenge key 100 to primary audio generator 405. In other implementations, an external entity may generate and supply challenge key 100 to primary audio generator 405. Challenge key 100 may include any type of content that may be used as a key. For example, challenge key 100 may include a sequence of random numbers. Primary audio 120 may include, for example, the sequence of random numbers of challenge key 100 spoken in a female voice, with each number of the sequence spoken with a random duration and with a random interval between the number and a previously spoken number in the sequence.

Secondary audio generator 410 may generate secondary audio 110 that may include audio content, such as, for example, one or more spoken voices. As one example, secondary audio 110 may include multiple male voices speaking different sequences of random letters, with each letter of each letter sequence spoken with a random duration and with a random interval between each letter and a previously spoken letter in a respective sequence. Primary audio generator 405 and secondary audio generator 410 may be implemented by DSP 390.

Audio mixer 130 may mix primary audio 120 and secondary audio 110 together to produce the mixed audio output audio challenge 140. Consistent with the example above, audio challenge 140 may include the female voice speaking the sequence of random numbers of primary audio 120 mixed in with the multiple male voices speaking different sequences of random letters of secondary audio 110.

As shown in FIG. 4, audio challenge 140 may be provided to a user I/F 230 of a respective user device (not shown). A user utilizing user I/F 230 may respond with a challenge reply 160 back to controller 400.

Exemplary Audio Human Verification Process

Figure 5:
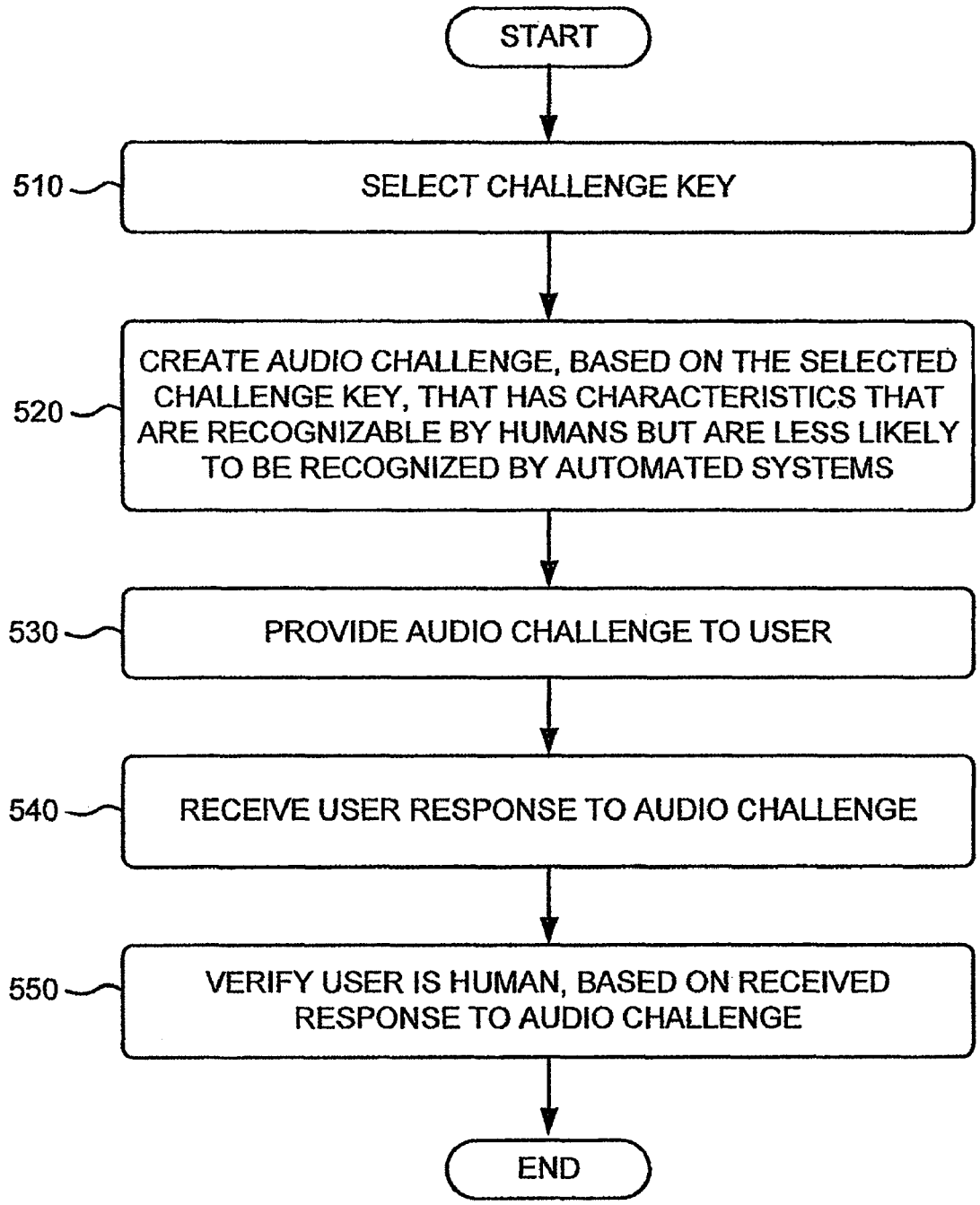
FIG. 5 is a diagram of an exemplary process for using an audio challenge for human verification according to exemplary implementations.

FIG. 5 is a flowchart that illustrates an exemplary process, consistent with exemplary embodiments, for using an audio challenge to perform human verification. The exemplary process of FIG. 5 may be implemented as software, hardware or firmware in human verifier 210, or in any combination of software, hardware or firmware.

The exemplary process may begin with the selection of a challenge key 100 (block 510). Challenge key 100 may include any type of sequence of numbers or letters having a random length. In one implementation, challenge key 100 may include a sequence of single digit numbers having a random length. Challenge key 100 may be supplied to primary audio generator 405 for use in creating primary audio 120.

An audio challenge 140 may then be created, based on the selected challenge key, which has characteristics that are recognizable by humans but are less likely to be recognized by automated systems (block 520). According to one exemplary embodiment, the audio challenge may be created by mixing primary audio 120 with secondary audio 110 using mixer 130. Primary audio 120 may include audio content (e.g., a spoken voice) that includes challenge key 100. For example, primary audio 120 may include the sequence of random numbers of challenge key 100 spoken in a female voice, with each number of the sequence spoken with a random duration and with a random interval between the number and a previously spoken number in the sequence. Secondary audio 110 may include audio content, such as, for example, one or more spoken voices. As one example, secondary audio 110 may include multiple male voices speaking different sequences of random letters, with each letter of each letter sequence spoken with a random duration and with a random interval between each letter and a previously spoken letter in a respective sequence. According to another exemplary embodiment, the audio challenge may include only primary audio 120. For example, the audio challenge may include a random length sequence of single digit numbers, with each number of the sequence spoken with a random duration and with a random interval between the number and a previously spoken number in the sequence.

Figure 6:
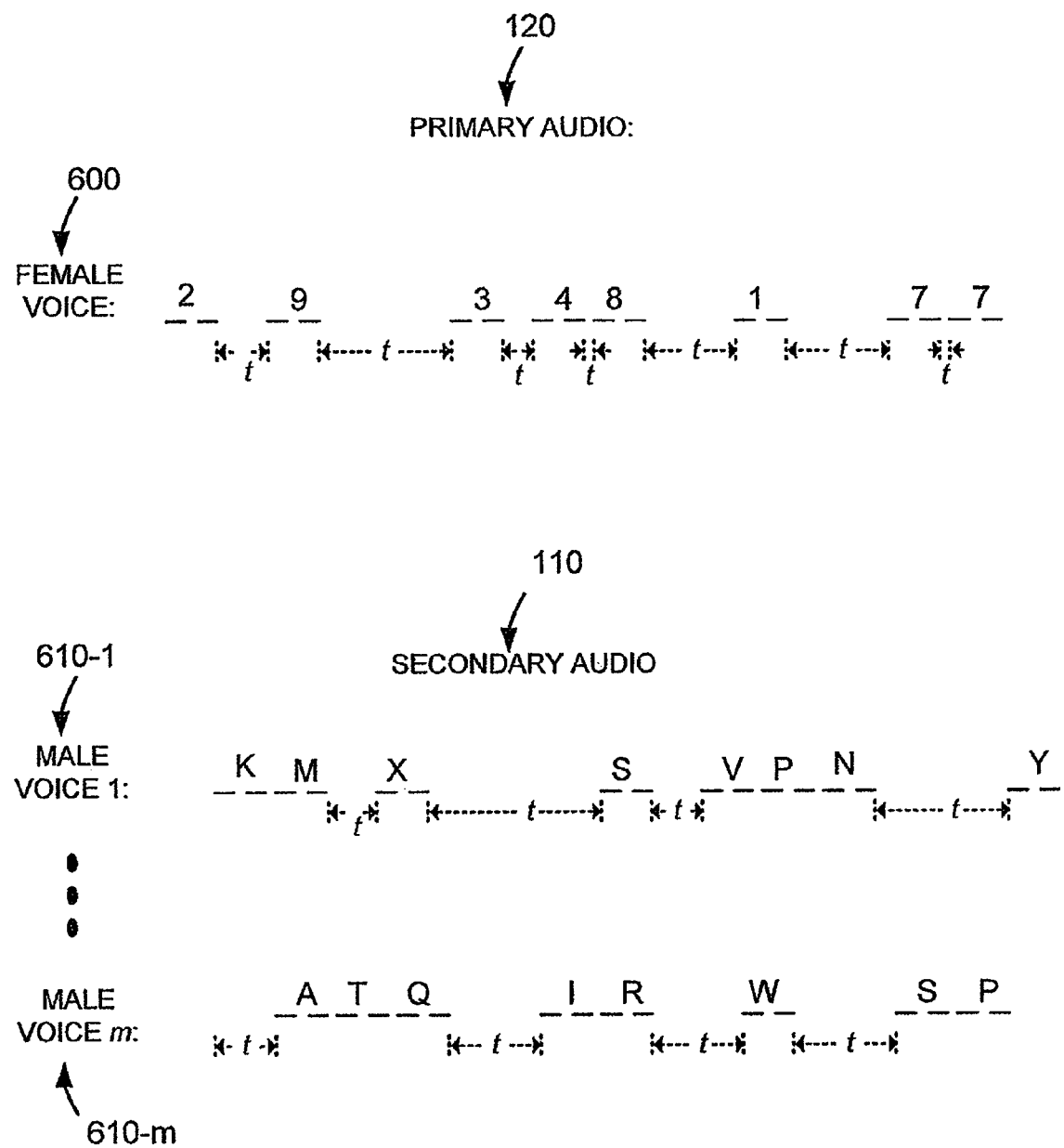
FIG. 6 is a diagram of the audio content of the primary and second audio of FIG. 4 according to one exemplary implementation.

FIG. 6 illustrates the creation of primary audio 120 and secondary audio 110 according to an exemplary implementation. As shown in FIG. 6, primary audio 120 may include a female voice 600 that speaks a challenge key that includes a sequence of random length digits having a random duration t between each of the digits. As further shown in FIG. 6, secondary audio 110 may include multiple male voices 610-1 through 610-m that each speak a sequence of random length letters having a random duration t between each of the letters.

The created audio challenge 140 may be provided to a user (block 530). Audio challenge 140 may be provided to a user at a user device 220 via a network 240. A user response may be received in response to the provided audio challenge (block 540). Upon receiving audio challenge 140 from human verifier 210, the user at user device 220 may listen to the audio challenge, extract challenge key 100 from the audio challenge and utilize user I/F 230 to reply with a challenge reply 160. Controller 400 may receive challenge reply 160 via network 240.

The user may then be verified as being human based on the received response to the audio challenge (block 550). If the content of challenge reply 160 matches challenge key 100, then controller 400 may determine that the user is human, and not an automated system. If, however, the content of challenge reply 160 does not match challenge key 100, then controller 400 may determine the user as a non-human automated system.

CONCLUSION

The foregoing description of preferred embodiments provides illustration and description, but is not intended to be exhaustive or to limit the invention to the precise form disclosed. Modifications and variations are possible in light of the above teachings or may be acquired from practice of the invention. While a series of acts has been described in FIG. 5, the order of the acts may vary in other implementations. Also, nondependent acts may be performed in parallel.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise. The term "characters," as used herein, is intended to refer to numbers and/or letters. The scope of the invention is defined by the claims and their equivalents.

We claim:

1. A method of using audio content in a telephone call to verify that a user is human rather than an automated system, the method, comprising:
generating an audio challenge using a first voice and a second voice that is different from the first voice; the first voice being audibly distinguishable from the second voice;
delivering, during the telephone call, an audible playback of the audio challenge to a user via a user device;
further instructing the user, during the telephone call, to extract a first set of information conveyed in the first voice;
receiving a voice reply from the user in response to audible playback of the audio challenge;
determining whether the user is human based on whether the voice reply includes the first set of information conveyed using the first voice in the audio challenge.

2. The method of claim 1, wherein the generating audio challenge comprises:
producing primary audio content using the first set of information and the first voice;
producing secondary audio content using the second voice;
mixing the primary audio content with the secondary audio content to generate the audio challenge.

3. The method of claim 1, wherein, each character of the random sequence of characters has a random time duration; wherein, each character has a random time interval with a previous character in the random sequence.

4. The method of claim 1, wherein, the first voice and the second voice differ in rate of speech or pitch.

5. The method of claim 1, wherein, the first voice conveys a first set of information including a random sequence of characters.

6. The method of claim 5, wherein, the random sequence of characters comprises a random sequence of numbers.

7. The method of claim 1, wherein, the random sequence of characters comprises a random sequence of letters.

8. The method of claim 1, wherein, the first voice comprises a human voice.

9. The method of claim 2, wherein the secondary audio content comprises random non-English words or characters that are unrelated to the first set of information.

10. The method of claim 2,
wherein, the secondary audio content comprises a second sequence of random characters;
wherein the second voice of the secondary audio content speaks the second sequence of random characters; and
wherein, each character of the second sequence is spoken with a random time duration and has a random time interval with a previous character in the second sequence.

11. The method of claim 1,
wherein, the second voice comprises multiple human second voices.

12. The method of claim 2, wherein, the secondary audio content comprises random words.

13. A method for using audio content provided in a telephone call to determine whether a user is human rather or an automated system, the method, comprising:
producing a first audio segment that includes an audio version of a key wherein the first voice includes one human voice of a particular gender;
producing a second audio segment using a second voice that is audibly distinguishable by a human-being from the first voice;
mixing the first and second audio segments to produce mixed audio;
delivering, during the telephone call, the mixed audio to a user for audible playback via a user device;
further instructing the user, during the telephone call, to extract contents of the key conveyed in the first voice;

receiving a voice reply from the user in response to audible playback of the mixed audio;

analyzing the voice reply to produce a verification result that indicates a likelihood that the user that responded with the reply is a human or an automated system;

wherein, the verification result is generated by ascertaining whether the voice reply from the user includes the contents of the key.

14. The method of claim 13, wherein, the first key has a random length sequence of characters including numbers or letters; wherein, in the first audio segment, the audio version of the key is conveyed in a first voice and that each character in the random length sequence is spoken with a random duration.

15. The method of claim 13, wherein the producing the second audio segment comprises:

recording another random length sequence of characters spoken with random intervals between each of the characters of the another random length sequence;

wherein the second voice includes multiple human voices of an opposite gender;

wherein, the second audio segment includes non-English words or characters.

16. The method of claim 13, wherein each of the multiple human voices speak different sequences of numbers or letters.

17. The method of claim 13, wherein the second audio segment comprises, one or more of: random spoken words, non-English words, characters, and audio jibberish.

18. The method of claim 13, wherein the producing the second audio segment comprises: recording another random length sequence of characters spoken with random intervals between each of the characters of the another random length sequence.

19. A system for delivering audio content during a telephone call, to verify that a user is human rather than an automated system, the system, comprising:

a first audio generator for producing a first audio segment that includes an audio version of a first information in a first voice;

a second audio generator for producing a second audio segment having second information in a second voice;

wherein, the second voice is different from the first voice;

a mixer for mixing the first and second audio segments to produce mixed audio;

an interface for:

audibly providing, during the telephone call, the mixed audio to a user, further instructing the user, during the telephone call, to extract contents of the first information conveyed in the first voice;

receiving a voice reply from the user in response to provision of the mixed audio;

a processing unit for determining whether the user is human by ascertaining whether the voice reply from the user includes the first information conveyed in the first voice.

20. The system of claim 19, wherein, the first voice and second voices are of the opposite gender.

* * * * *